No. 662,406. Patented Nov. 27, 1900.
E. R. EDSON.
PROCESS OF EXTRACTING OIL AND GLUE.
(Application filed Dec. 18, 1899.)
(No Model.)
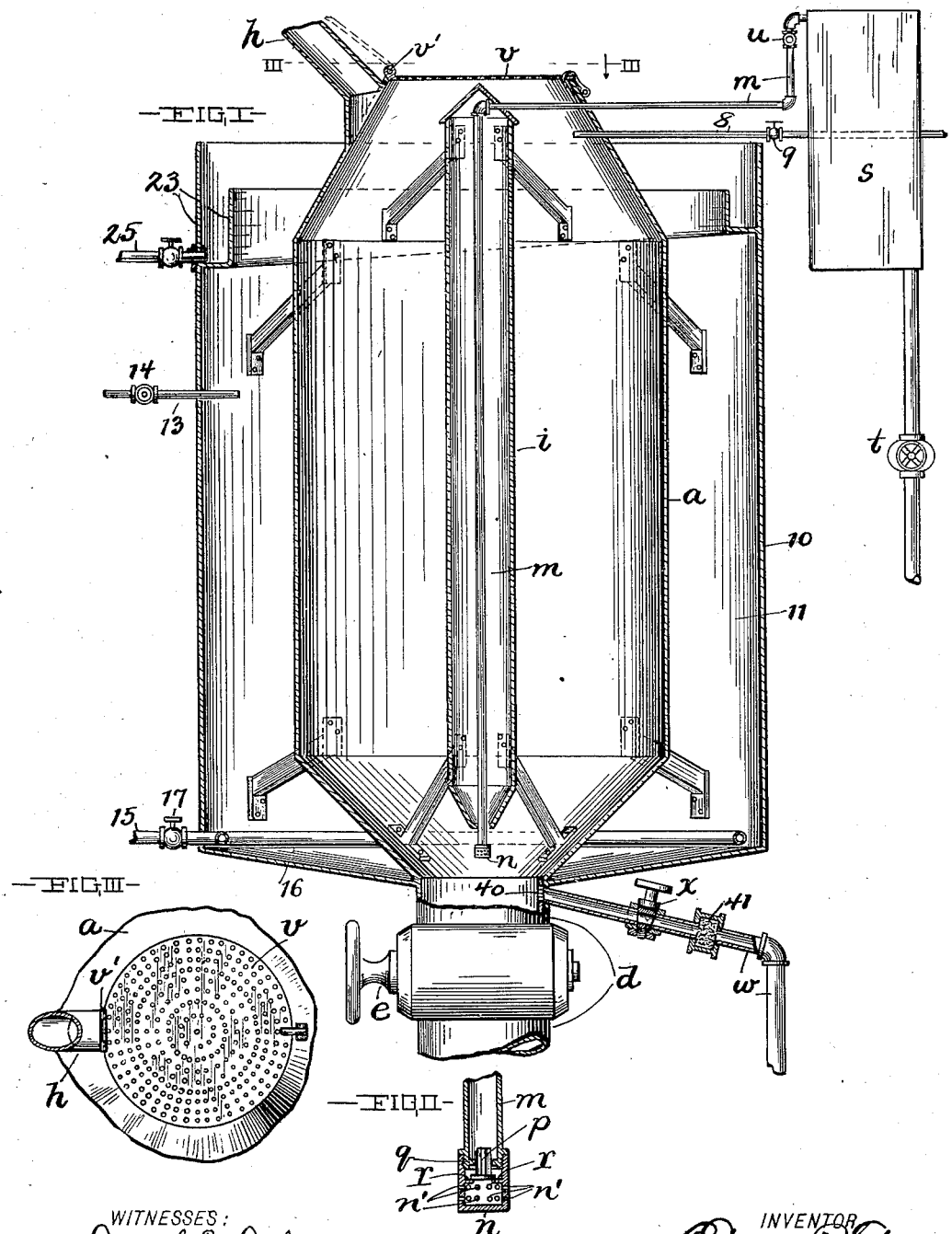
WITNESSES:
Daniel E. Daly.
Victor C. Lynch.
INVENTOR
Eugene R. Edson
BY
Lynch & Dorer
his ATTORNEYS
THE NORRIS PETERS CO., PHOTO-LITHO., WASHINGTON, D. C.

United States Patent Office.

EUGENE R. EDSON, OF CLEVELAND, OHIO, ASSIGNOR TO THE BUCKEYE FISH COMPANY, OF SAME PLACE.

PROCESS OF EXTRACTING OIL AND GLUE.

SPECIFICATION forming part of Letters Patent No. 662,406, dated November 27, 1900.

Application filed December 18, 1899. Serial No. 740,621. (No specimens.)

*To all whom it may concern:*

Be it known that I, EUGENE R. EDSON, a resident of Cleveland, county of Cuyahoga, and State of Ohio, have invented certain new and useful Improvements in Producing Glue and Oil from the Entrails, Gills, Ova, and Offal of Fish; and I do hereby declare the following to be a full, clear, and exact description of the invention, such as will enable others skilled in the art to which it pertains to make and use the same.

This invention relates to improvements in producing glues from the entrails, gills, ova, and offal of fish.

The object of this invention is to produce glues from the aforesaid parts of fish without any appreciable loss in the substance contained within the said fish parts that is convertible into glue and without injury to the said substance during the extraction or separation of the said substance from the remainder of the material.

With this object in view the invention consists in the certain improvements hereinafter described, and pointed out in the claims.

Apparatus suitable for use in carrying out my invention is illustrated in the accompanying drawings, wherein—

Figure I is a side elevation, mostly in central vertical section, of the said apparatus. Fig. II is a side elevation, partly in vertical section, of the lower end portion of the pipe employed in conveying air under pressure into the lower portion of the mass of fish parts undergoing treatment with the solvent-constituting water. Fig. III is a top plan in section on line III III.

Referring to the drawings, receptacle $a$ has its lower end provided with a valved discharge pipe or outlet $d$, with which the chamber of the receptacle $a$ communicates. The outlet $d$ constitutes the receptacle's outlet for the guano-forming residue.

The tank or receptacle $a$ is provided centrally with a vertically-arranged or upright core $i$, that is closed at its lower end.

A pipe or pipe-line $m$ is arranged to conduct air under pressure into and centrally of the lower portion of the receptacle $a$ and is provided within its lower end with a check-valve $p$, as shown in Fig. II, and with a seat $q$ for the inner end of the valve and with stop-forming flanges or lugs $r$ for limiting the outward movement of the valve. The valve $p$ is free to move, therefore, in the direction required to establish open relation between the pipe $m$ and the chamber of the receptacle $a$ by any pressure within the said pipe $m$, but is closed and retained closed by the pressure within the said chamber when there is no pressure in the pipe $m$ or when the pressure in the pipe $m$ becomes less than the back pressure within the chamber. The pipe $m$ below the path of the check-valve is provided with a vertically-arranged cap or head $n$, that has numerous lateral perforations or orifices $n'$ and forms an annular screen that prevents ingress of solid material from the chamber of the receptacle $a$ into the pipe $m$ and causes the air discharged from the pipe $m$ to be equally distributed in all directions laterally within the said chamber. The pipe $m$ extends outside of the receptacle $a$ and is in open relation with the chamber of a tank $s$, wherein air under pressure is stored and supplied by a suitably-operated pump $t$, that has its outlet connected with the tank $s$ and has its inlet communicating with the external atmosphere. The pipe $m$ is provided with a valve $u$ for regulating the supply of air to the receptacle $a$. The employment of an air-pressure of several pounds, preferably from five to ten pounds, is found desirable.

The outlet $d$ of the receptacle $a$ is provided with a valved drain-pipe $w$ for draining from the said receptacle any glue solution accumulating in the outlet and in the lower portion of the receptacle $a$ above the valve $e$ of the outlet and is provided with a valve $x$. The pipe $w$ at its receiving end is provided with a screen 40 for preventing the ingress of solid matter into the pipe. The pipe $w$ is provided also, preferably beyond the outer end of the casing that contains the valve $x$, with a filter 41 for filtering the liquid flowing through the said pipe.

The provision of the core $i$ prevents solidifying or caking of the mass within the receptacle $a$.

A valved water-supply pipe 8 is arranged to discharge into the upper end of the receptacle $a$.

The tank or receptacle $a$ is arranged centrally of a vertically-arranged or upright tank 10, that is larger diametrically than the receptacle $a$, so as to form a chamber 11, surrounding the said receptacle $a$. The tank 10 extends from the lower end of the receptacle $a$ upwardly to near the upper end of the receptacle $a$. The receptacle $a$ is supported from and internally of the tank 10.

A water-supply pipe 13 extends and discharges into the chamber 11 of the tank 10 and is provided with a valve 14.

A steam-supply pipe 15 extends into the lower end of the chamber 11 and there terminates in a coil 16, employed in heating the water supplied to the said chamber. The pipe 15 is provided with a valve 17.

The operation of the apparatus is as follows: The material that is to be treated within the apparatus is introduced into the tank or receptacle $a$ after the operator has closed the valve $e$ of the receptacle's outlet $d$ and the valve $x$ of the drain-pipe $w$. The valve $u$ of the air-supply pipe $m$ is normally closed. The valve 9 of the water-supply pipe 8 is normally closed. When the receptacle $a$ has been supplied with a suitable amount of material to be treated, the valve 9 is opened, whereupon water will run from the pipe 8 upon the material within the receptacle $a$, and such relative quantities of water and material requiring treatment are introduced into the receptacle as will prevent caking of the solid material in a vertical direction and will cause the said receptacle to be filled to near the latter's upper extremity. The water discharged into the receptacle $a$ from the pipe 8 constitutes a solvent suitable for the treatment of the material within the receptacle. Having supplied the receptacle $a$ with the material to be treated and the solvent-constituting water, the outer tank 10 has its annular chamber 11 supplied with water from the pipe 13 upon opening the valve 14 of the said pipe. The chamber 11 is filled with water to near its upper extremity. After the chamber 11 has been supplied with water from the pipe 13 the valve 17 of the steam-supply pipe 15 is opened, so as to supply steam to the heating-coil 16, and the water within the chamber 11 is heated and boiled. The diameter of the receptacle $a$ is preferably about two-thirds of the diameter of the tank 10. In any event the diameter or transverse area of the receptacle $a$ is such relative to the diameter or transverse area of the chamber 11 and the boiling water within the chamber 11 is maintained at such a temperature that the mass of material within the receptacle $a$ shall be heated to and maintained at a comparatively high temperature, lower, however, than 212° Fahrenheit. A temperature of from about 150° to about 200° is desirable. A temperature as high as or greater than 212° Fahrenheit should be avoided in the treatment of the mass of material within the receptacle $a$, because the treatment of the said material with a temperature as high as or above the boiling-point would result in the conversion of the oil that is to be extracted from the material into an emulsion and would discolor or otherwise injure the oil and destroy the congealableness of the substance to be dissolved in the water to produce glue upon the subjection of the solution to a suitably low temperature after its removal from the receptacle $a$. During the treatment of the material within the receptacle $a$ with the solvent at a suitable temperature below 212° Fahrenheit the scum-forming impurities that constitute the lightest portion of the mass rise first and appear and accumulate on top of the mass within the upper end of the receptacle and overflow from the receptacle's upper extremity onto the boiling water in the tank 10, whence they are removed in any suitable manner. The oil extracted from the material within the receptacle $a$ is the next lightest portion of the mass of material undergoing treatment, and consequently rises into the upper end of the receptacle and causes any scum that has not yet overflown from the receptacle to overflow therefrom. Oil extracted from the material within the receptacle $a$ continues to rise and ultimately overflows from the upper open end of the said receptacle onto the boiling water within the chamber 11 of the tank 10. The steam rising from the boiling water through the oil floating upon the water vaporizes impurities in the oil, and the purified oil is removed from the water in any suitable manner and preferably by permitting the oil to overflow from the tank 10 into a trough 23, with which the upper end of the said tank is provided, which trough is provided with a valved drain-pipe 25. The desired level of boiling water within the chamber 11 can be readily maintained by such a regulation of the valve 14 of the pipe 13 as will first establish a suitable level and thereupon maintain the said level during the boiling of the water by establishing a continuous flow of water from the pipe 13 into the chamber 11 equal to the quantity of water continually passing off in the form of steam.

The process that constitutes the subject-matter of this application and is, in the main, carried out by use of the hereinbefore-described apparatus comprises the introduction of the entrails, gills, ova, and offal of fish into the inner receptacle $a$ and therein treating the material with water at a comparatively high temperature, lower, however, than 212° Fahrenheit—for instance, a temperature of from 150° to about 200° Fahrenheit. The material is treated at this temperature for a few hours, preferably about two or three hours. The temperature is kept below the boiling-point by heating the mass within the said receptacle by the heat emanating from the boiling body of water surrounding the said receptacle. The material undergoing treatment does not come in direct contact with the boiling water, nor with steam employed in heating the said water. The substance contained in the material undergoing treatment and convertible into glue is dissolved in the water. The oil contained in the material, and simultaneously extracted therefrom with the glue-forming substance, is assisted in rising by air under pressure introduced by the pipe $m$ by opening the valve $u$ of the said pipe and as it reaches the upper extremity of the receptacle overflows from the latter, as already hereinbefore described. The mass remaining within the receptacle is then permitted to settle for a suitable length of time—from one to several hours—for the purpose of clarifying the glue solution, whereupon the latter, that has accumulated within the lower portion of the receptacle $a$, is drained from the receptacle through the drain-pipe $w$ by opening the latter's valve and is filtered in its passage through the said pipe.

The treatment of the material described in the last preceding paragraph has not removed all of the glue-forming substance and oil from the material, and additional water is supplied to the mass remaining within the receptacle $a$, and the said mass is again treated with the added water at a suitable temperature below 212° Fahrenheit, preferably a temperature of from 125° to 200° Fahrenheit, for a period of several hours—for instance, about three hours—and during the last-mentioned treatment of the mass within the receptacle $a$ air under pressure is freely introduced by means of the pipe $m$ into the lower portion of the mass, which air disintegrates the material, as required, to assist the solvent-constituting water in extracting the oil and glue-forming substance still contained within the solid matter of the mass, and the said oil and glue-forming substance are drained from the receptacle in the manner already hereinbefore described. The glue solution is then congealed by subjecting the solution to a temperature below 50° Fahrenheit and then is sliced and dried in any approved manner. The excess of water contained in the solution is preferably evaporated before the solution is permitted to congeal or solidify.

The upper end of the receptacle $a$ is provided with a screen $v$ that extends over and across the upper end of the receptacle and has a fine mesh, so as to reduce to a minimum the amount of solid material flowing with the oil from the said receptacle. The receptacle $a$ has a material inlet or feed spout $h$, that discharges into the receptacle next below the screen $v$. The oil is screened, therefore, before it leaves the receptacle $a$. The screen $v$ is hinged to the receptacle, as at $v'$, and can therefore be swung out of the way, as shown in dotted lines, if it becomes desirable, during the accumulation of the scum preceding the overflow of oil to afford to the scum a larger and more rapid escape from the receptacle.

The apparatus illustrated in the drawings and employed in carrying out the improvements that constitute the subject-matter of this application forms a large portion of the subject-matter disclosed and claimed in the pending application, Serial No. 746,401, filed by me in the United States Patent Office November 9, 1899.

What I claim is—

1. The herein-described process of extracting oil and a glue-producible substance from the entrails, gills, ova and offal of fish, consisting in treating the material, within a receptacle, with water at a comparatively high temperature but below 212° Fahrenheit for a few hours, overflowing oil from the receptacle, and introducing air under pressure into the lower portion of the mass; then permitting the mass to settle; then draining the liquid, that holds glue-producible substance in solution, from the receptacle; then again supplying the receptacle with water and treating the material remaining in the receptacle for several hours at a comparatively high temperature below 212° Fahrenheit and disintegrating the material during the last-mentioned treatment, substantially as and for the purpose set forth.

2. An improvement in extracting oil and a glue-producible substance from the entrails, gills, ova and offal of fish, consisting in treating the material, with water, within a receptacle surrounded by a body of boiling water and having an oil-overflow at its upper end and maintaining the mass at a temperature below 212° Fahrenheit during the said treatment; disintegrating the material undergoing treatment and overflowing the oil from the said receptacle, screening the oil rising from the mass before the oil overflows to the body of boiling water, and draining the glue-producible solution from the receptacle, substantially as and for the purpose set forth.

3. An improvement in extracting oil and a glue-producible substance from the entrails, gills, ova and offal of fish, consisting in treating the material, within a receptacle, with water at a temperature between about 125° and 212° Fahrenheit, for a few hours; maintaining the temperature, during the said treatment, below 212° Fahrenheit; overflowing oil from the receptacle and disintegrating the mass during the said treatment; permitting the mass to settle after disintegration, and then draining the glue-producible solution from the receptacle.

Signed by me at Cleveland, Ohio, this 1st day of December, 1899.

EUGENE R. EDSON.

Witnesses:
C. H. DORER,
A. H. PARRATT.